Dec. 4, 1928.
N. A. CHRISTENSEN
1,693,887
VEHICLE BRAKE MECHANISM
Filed April 3, 1924    2 Sheets-Sheet 1
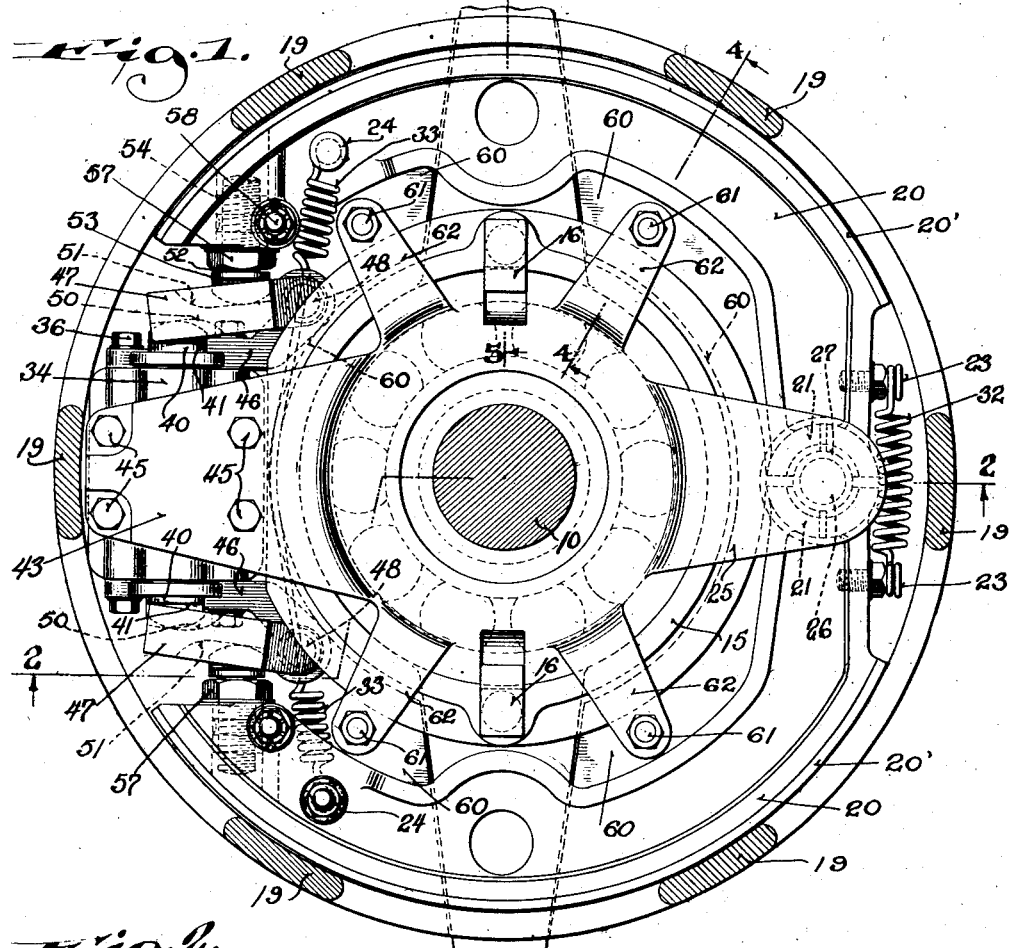
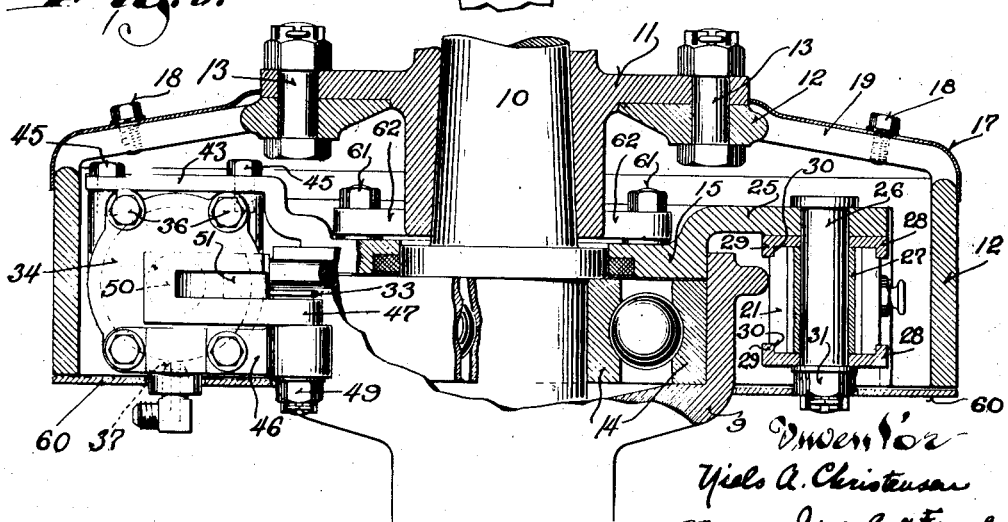

Dec. 4, 1928.  N. A. CHRISTENSEN  1,693,887
VEHICLE BRAKE MECHANISM
Filed April 3, 1924  2 Sheets-Sheet 2
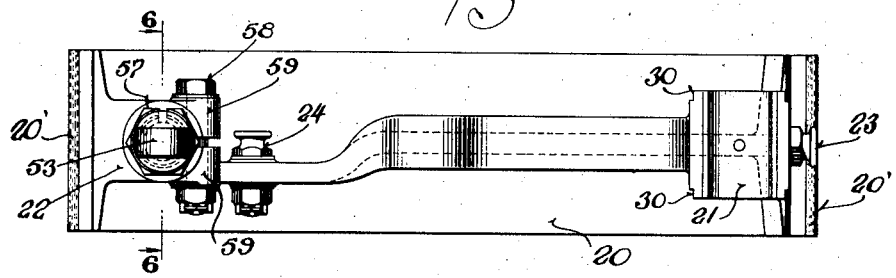
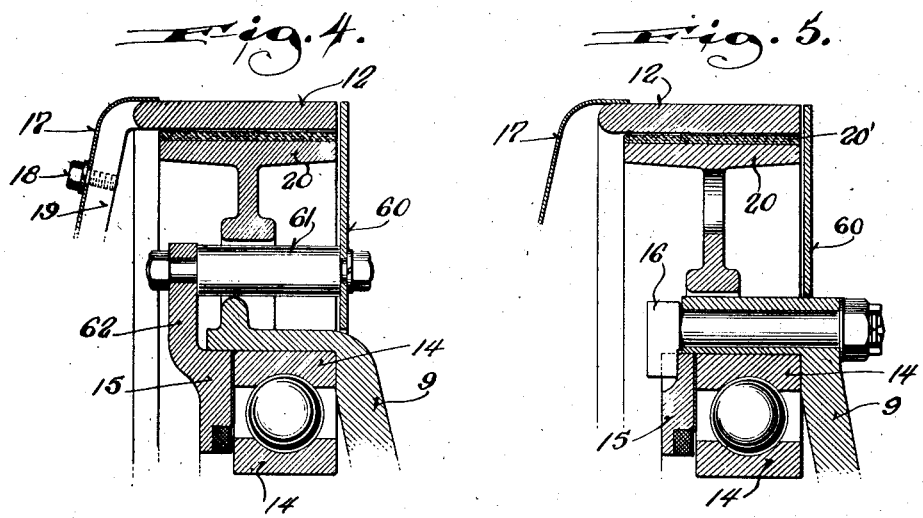
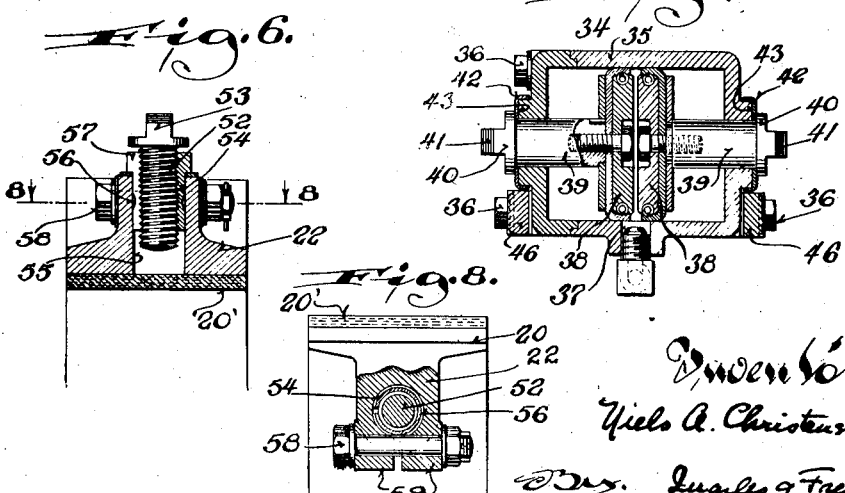

Patented Dec. 4, 1928.

1,693,887

UNITED STATES PATENT OFFICE.

NIELS A. CHRISTENSEN, OF MILWAUKEE, WISCONSIN.

VEHICLE BRAKE MECHANISM.

Application filed April 3, 1924. Serial No. 703,952.

The invention relates to vehicle brake mechanism, and more particularly to such mechanism for use with automotive vehicles and trailers for such vehicles.

The object of this invention is to provide a brake mechanism in which a powerful braking force is applied to the brake through the use of a fluid-pressure-operated-motor and a leverage connection between said motor and the element forming the brake.

A further object of the invention is to provide a novel form of adjustment for the brake member or members in combination with the operating connections therefor.

A further object of the invention is to provide a wheel brake mechanism in which the parts are protected from mud or dirt.

A further object of the invention is to provide a brake mechanism of efficient construction which can be mounted in the relatively small space available between the brake-drum and the axle housing of rear wheels of certain automotive vehicles.

In the drawings: Fig. 1 is a plan view of the brake mechanism embodying the invention, said view having been taken as looking into the brake-drum from the wheel side and parts of said brake-drum being shown in section;

Fig. 2 is a section taken on the line 2—2 of Fig. 1, with a part of the wheel hub shown;

Fig. 3 is a detail plan view of one of the brake-shoes;

Fig. 4 is a detail sectional view taken on the line 4—4 of Fig. 1;

Fig. 5 is a detail sectional view taken on the line 5—5 of Fig. 1;

Fig. 6 is a detail sectional view taken on the line 6—6 of Fig. 3;

Fig. 7 is a detail sectional view taken through the fluid-pressure-operated motor;

Fig. 8 is a detail sectional view taken on the line 8—8 of Fig. 6.

In the following specification the words "brake-drum" will be used in the generic sense, unless otherwise qualified, to designate any part associated with the vehicle wheel and which is intended to reduce its speed or stop its motion when another member is brought into braking engagement therewith, and the word "brake" will be used in the generic sense, unless otherwise qualified, to designate the member or members which is or are brought into frictional or braking contact with the brake-drum.

In the drawings the numeral 9 designates a part of the axle housing, 10 the wheel shaft, 11 the hub of the wheel mounted on said shaft, 12 the brake-drum secured by bolts 13 to a flange on said hub, 14 a ball-race mounted in a recess in said housing and secured in position by a retainer plate 15 which is clamped against the outer ring of said race by hook-bolts 16 mounted in the axle housing. Dirt is excluded from one side of the drum by a cover-plate 17 secured by bolts 18 to the webs 19 of the brake-drum.

In the particular embodiment here shown the brake is of the shoe type, comprising a pair of brake-shoes 20. Each shoe 20, as shown in Figs. 1 and 3, has a pivot-pin-bearing portion 21 at one end and a split lug portion 22 at its other end and carries spring anchor bolts 23 and 24 adjacent its ends. An arm 25 formed integral with the retainer plate 15 carries the pivot pin 26 having a bearing bushing 27 thereon which receives the bushed bearing portions 21 of the shoes 20 between bearing washers 28 which have inwardly extending flanges 29 seated in annular recesses 30 in the exterior edges of bearing portions 21, said pin being threaded to receive a nut 31 to hold the parts in assembled relationship. The ends of the shoes formed by the bearing portions 21 are held in operative position against the pivot pin or its bearing by a spring 32 anchored at its ends to bolts 23. Thus, the shoes 20 are free to turn at one end on a pivot carried by the arm 25 so that their free ends may be moved outwardly to bring the shoes into braking engagement with the drum, and said ends are normally held in release position by means of a spring 33 anchored at its ends to the bolts 24.

A fluid-pressure-operated motor 34 is operatively connected to the free ends of the shoes for applying the brake, the preferred form of which is herein shown in detail in Fig. 7. This motor includes a two-part brake cylinder 35 whose parts are secured together by bolts 36, said cylinder having a central port 37 for the inlet and exhaust of pressure fluid. A pair of opposed suitably packed pistons 38 work in the cylinder in opposite directions and have piston rods 39 bolted and pinned or otherwise suitably secured to the heads of said pistons and projecting from the ends of the cylinder. Each piston-rod has a head 40 exterior of the brake-cylinder provided with a tongue 41. The head 40 is preferably larger than the main part of the rod and may have a flanged washer 42 abutting against it and forming a water-shed, and each piston is limited in its movement by engagement of the inner end of the head or washer with a shoulder 43 formed by the adjacent end of the cylinder. The brake-cylinder is secured to an arm 44, on the retainer plate 15, alined with the arm 25 by bolts 45.

Bearing brackets or supports 46 are bolted to the ends of the brake-cylinder and form supporting bearings for levers 47 at points offset from the piston-rods of the motor and preferably adjacent the axle housing. Each lever 47 has a pin portion 48 pivotally mounted in the bracket 46 and held in assembled position by a nut 49 on its threaded end, and slots 50 and 51 are formed, as by milling, in the sides of said levers at a distance from its point of pivotal connection with its supporting bracket. These levers form operating connections for transmitting the outward movement of the fluid-pressure-operated pistons to the brake shoes and due to the leverage employed with a greater force than were a direct connection between said pistons and shoes used, since that portion of the brake shoe which contacts with the lever is at a less distance from the pivot of said lever than the point where contact between the piston-rod and said lever occurs. Because of the necessity for compensating for wear in service, these connections must have provision for adjustment so that the brake-shoe clearance may be adjusted and maintained.

In the present instance the tongue 41 on each piston-rod fits in the slot 50 of the lever 47 adjacent thereto and a jack-screw or bolt 52 has its head milled or otherwise suitably formed to provide a tongue 53 fitting into the slot 51 of the same lever, said screw being adjustably mounted in the split lug portion 22 of the shoe 20.

In each instance I provide a threaded sleeve 54 mounted in a split bore 55 of the split lug portion 22 and interiorly threaded to take the screw 52, said sleeve having an annular groove 56 formed therein and a hexagonal or polygonal head 57 exterior of the shoe. A clamping bolt 58 extends through the split ports 59 of the lug portion 22 to bind these parts tightly together about the sleeve 54, and the bore within which this bolt 58 passes intersects the space formed by the groove 56 so that said bolt engages the sides of a portion of said groove and thereby holds the sleeve against lengthwise removal from the shoe whether said sleeve is free to turn in said shoe or is clamped thereto by said bolt. Thus, by loosening up on the clamping bolt 58 and turning the sleeve 54 in the proper direction by a wrench applied to the head 57 the screw 52 is adjusted relative to said sleeve, while in engagement with the lever 47, and consequently to the brake-shoe in which the sleeve is mounted so that the spring 33 may hold the shoes 20 in the desired release position. As a part of the drum is in the form of a spider, the removal of the plate 17 gives access to the bolt 58 and the heads of the sleeves 54.

Thus, when a fluid-pressure medium such as compressed air is introduced from a suitable source of supply into the brake-cylinder through the port 37, the pistons move outwardly and the rods engaging the levers 47 swing them outwardly and the levers in turn act directly upon the screws 53 which form a relatively fixed part of each shoe to swing the free ends of said shoes outwardly about their pivot and into braking engagement with the drum 12, said shoes usually being provided with a suitable brake-lining 20' for contact with the drum. It is to be noted that the free end of the lever 47 is held in between the piston rod of the motor on one side and the jack-screw on the other, and this is of advantage because if any play should develop in the pivot of the lever such play will not seriously interfere with the direct application of the braking pressure from the motor through the lever to the shoe.

To exclude dirt from the open end of the drum, I provide a two-part cover-plate 60 carried on or bolted to studs 61 mounted on radially extending arms 62 of the retainer plate 15.

No mechanism has been shown for controlling the passage of compressed air to and from the brake-cylinder, as such mechanism is, of course, distinct subject matter from the brake mechanism itself, though it will be understood that such mechanism includes a valve structure which establishes communication between the supply of compressed air and the brake-cylinder to operate the pistons therein, and then cuts off this supply and connects the brake-cylinder with the atmosphere for release of the brake.

While compressed air is the preferred pressure-transmitting medium, because of its ease of control, its adaptability for efficient service throughout all seasons of the year in different climates, and its practical efficiency even where small leakage may occur in the motor, it is to be understood that I do not wish to be limited thereto, as any other suitable gas, oil, or other suitable liquid may be used to operate the motor.

Furthermore, while the device is shown in connection with a rear wheel, it will be understood that it may be used on a steering wheel by mounting the motor and the support for the brake-shoes on arms carried by the steering knuckle as shown in United States Patent No. 1,468,600, of September 18, 1923.

I, therefore, desire it to be understood that this invention is not to be limited to any specific form or arrangement of parts except in so far as such limitations are specified in the claims.

What I claim as my invention is:

1. In brake mechanism of the class described, the combination with a revoluble brake drum, of a support, a pair of brake shoes mounted within and engageable with said drum and having their adjacent ends pivotally mounted on said support, a pivoted lever adjacent the free end of each shoe and in direct thrust engagement therewith, a fluid-pressure-operated motor including a pair of oppositely moving pistons, each having a thrust-rod directly engageable with one of said levers whereby both levers and shoes are moved to apply the brake upon the outward movement of said pistons, and means to release said shoes from said drum.

2. In brake mechanism of the class described, the combination with a revoluble brake-drum, of a support, a movable brake member engageable with said drum and associated with said support, a jack-screw carried by said brake member, a lever having a non-rotatable connection with said screw, means for adjusting the screw relative to the brake member to determine the brake member's release position, means to normally hold said brake member in release position, and means acting on said lever to move the brake member into braking engagement with said drum.

3. In brake mechanism of the class described, the combination with a revoluble brake drum, of a support, a movable brake member engageable with said drum and associated with said support, a jack-screw carried by said brake-member, a pivoted lever having a tongue-and-groove connection with said screw, means for adjusting the screw relative to the brake member to determine the brake member's release position, means to normally hold said brake member in release position, and means acting upon said lever to move the brake member into braking engagement with said drum.

4. In brake mechanism of the class described, the combination with a revoluble brake-drum, of a support, a movable brake member engageable with said drum and associated with said support, a brake-cylinder, a fluid-pressure-operated member in said cylinder having a thrust rod, a jack-screw carried by said brake member, a pivoted lever having a tongue-and-groove connection with said screw and a tongue-and-groove connection with said thrust-rod whereby to transmit the braking force of the piston to said brake member, means for adjusting the screw relative to the brake member to determine the brake member's release position, and means to normally hold said brake member in release position.

5. In a brake mechanism of the class described, the combination with a revoluble brake drum, of a support, a movable brake member engageable with said drum and associated with said support, an actuator, a pivoted lever, an adjustable direct-thrust-and-guide connection between said lever and brake member, a direct-thrust-and-guide connection between said actuator and lever, and means to release said brake member from engagement with said drum.

6. In brake mechanism, a brake member having an adjustable thrust connection comprising a sleeve rotatable in said brake member and having a wrench-engaging portion, and a thrust member having threaded connection with said sleeve and adjustable lengthwise thereof.

7. In brake mechanism, a brake member having an adjustable thrust connection comprising a sleeve rotatable in said brake member and having a wrench-engaging portion, means for clamping said sleeve against rotation, and a thrust member having threaded connection with said sleeve and adjustable lengthwise thereof.

8. In brake mechanism, a brake member having an adjustable thrust connection comprising a sleeve rotatable in said brake member and having a wrench-engaging portion, means for holding said sleeve against longitudinal movement relative to said brake member, means for clamping said sleeve against rotation, and a thrust member having threaded connection with said sleeve and adjustable lengthwise thereof.

9. In brake mechanism, the combination of a brake member having a split bearing, a split sleeve rotatable in said bearing and having a wrench-engaging portion, a thrust member having threaded connection with said sleeve and adjustable lengthwise thereof, and means for drawing the split portions of said bearing together to thereby hold both said sleeve and thrust member against rotation.

10. In brake mechanism, the combination of a brake member having a split bearing, a split sleeve rotatable in said bearing and having an annular groove and a wrench-engaging portion, a thrust member having threaded connection with said sleeve and adjustable lengthwise thereof, and a clamping bolt passing through the separated ends of said bearing to clamp said sleeve and thrust member against rotation and associated with said groove to prevent longitudinal movement of said sleeve relative to said brake member.

11. In a brake mechanism of the class described, the combination with a revoluble brake drum, of a support, a movable brake member engageable with said drum and associated with said support, a brake cylinder, a fluid-pressure-operated member in said cylinder having a thrust rod, a pivoted lever, an adjustable direct thrust-and-guide connection between said lever and brake member; a direct thrust-and-guide connection between said rod and lever, and means to release the brake member from engagement with said drum.

In testimony whereof, I affix my signature.

NIELS A. CHRISTENSEN.